United States Patent [19]
Miyagawa et al.

[11] Patent Number: 6,101,926
[45] Date of Patent: Aug. 15, 2000

[54] RICE PROCESSING APPARATUS WITH CONTINUOUSLY STEAMING AND BOILING

[75] Inventors: Tomoyuki Miyagawa; Yoshio Ishii; Takashi Tanaka, all of Tokyo, Japan

[73] Assignee: Showa Sangyo Co., Ltd., Tokyo, Japan

[21] Appl. No.: 09/492,387

[22] Filed: Jan. 27, 2000

Related U.S. Application Data

[62] Division of application No. 09/134,439, Aug. 14, 1998, Pat. No. 6,035,764.

[51] Int. Cl.$^7$ ............................. A47J 27/00; A47J 27/16; A23L 1/10
[52] U.S. Cl. ............................. 99/330; 99/355; 99/386; 99/517; 99/417; 99/443 C; 99/470; 99/483
[58] Field of Search ............................. 99/330–334, 339, 99/340, 352–355, 386, 403–418, 443 R, 443 C, 477–479, 483, 516, 517; 126/21 A; 426/510, 511, 523; 219/401, 400

[56] References Cited

U.S. PATENT DOCUMENTS

| | | | |
|---|---|---|---|
| 4,059,919 | 11/1977 | Green | 99/356 |
| 4,571,341 | 2/1986 | Sugimura | 99/404 X |
| 4,607,495 | 8/1986 | Fujimoto et al. | 99/537 X |
| 4,637,936 | 1/1987 | White et al. | 426/523 |
| 4,649,055 | 3/1987 | Kohlwey | 426/521 X |
| 4,677,907 | 7/1987 | Weibye | 99/483 |
| 4,866,232 | 9/1989 | Stone | 99/403 X |
| 4,876,917 | 10/1989 | Sugimura et al. | 99/355 |
| 4,882,188 | 11/1989 | Sawada et al. | 99/470 X |
| 4,934,259 | 6/1990 | Watanabe | 33/339 |
| 5,069,923 | 12/1991 | Hubbard et al. | 99/356 X |
| 5,130,153 | 7/1992 | McIlroy et al. | 99/330 X |
| 5,241,149 | 8/1993 | Watanabe et al. | 426/410 X |
| 5,355,777 | 10/1994 | Chen et al. | 99/403 X |
| 5,370,042 | 12/1994 | Tolchin et al. | 99/407 X |
| 5,429,041 | 7/1995 | Zittel | 99/470 X |
| 5,567,457 | 10/1996 | Martinek | 426/510 X |
| 5,587,194 | 12/1996 | Nakatani et al. | 426/521 |
| 5,669,288 | 9/1997 | Zittel et al. | 99/443 C |
| 5,752,431 | 5/1998 | Zittel | 99/355 X |

FOREIGN PATENT DOCUMENTS

| | | |
|---|---|---|
| 59-11150 | 1/1984 | Japan. |
| 63-9406 | 1/1988 | Japan. |
| 63-245646 | 10/1988 | Japan. |
| 4-129510 | 4/1992 | Japan. |
| 5-308915 | 11/1993 | Japan. |
| 9-107896 | 4/1997 | Japan. |
| 9-294678 | 11/1997 | Japan. |

OTHER PUBLICATIONS

"Rice Cooking Techniques and Their Applications", edited by Hiroaki Horigome, Kogyo Gijutsukai K.K., pp. 314–347 (1990).

*Primary Examiner*—Timothy Simone
*Attorney, Agent, or Firm*—Armstrong, Westerman, Hattori, McLeland & Naugthon

[57] ABSTRACT

Disclosed is a method and apparatus adaptable for various kinds of raw rice and a variety of finally cooked rice, which comprises a combination of a steaming line constructed of a single endless conveyor and a settling and/or cooling line constructed of a plurality of combined endless conveyor belts arranged downstream of the steaming line. The settling and/or cooling line is combined with the rice continuously steaming line which comprises the steps of placing rice, that has finished preliminary water absorption, on a carrying surface of a single conveyor belt evenly, moving the carrying surface while blowing steam to the rice placed on the carrying surface, and effecting primary steaming of the rice, sprinkling of hot water to absorb water into the rice, and secondary steaming of the rice having absorbed water successively during movement of the carrying surface without agitating the rice, the above steps being performed within a sealed housing. Hot water is sprinkled to absorb water into the rice at the same time as when steam is blown to the rice. The variety of cooked rice include rice steamed in a state completely changed into α-starch, the steamed rice being selected from the group consisting of white rice, Sushi rice, seasoned rice, red rice, glutinous rice, sake rice and rice cakes. The variety of cooked rice may include rice steamed in a state partly changed into α-starch for quick cooking.

1 Claim, 4 Drawing Sheets

RICE PROCESSING APPARATUS WITH CONTINUOUSLY STEAMING AND BOILING

This application is a division of prior application Ser. No. 09/134,439 filed Aug. 14. 1998, now U.S. Pat. No. 6,035,764.

TECHNICAL FIELD

The present invention relates to a method for processing various kinds of raw rice and producing a variety of cooked rice by using an apparatus for continuously steaming grains while the grains are moving with and on an endless conveyor belt, as well as an apparatus for implementing the method.

BACKGROUND ART

Large-scale continuous rice cooking apparatus for industrial purposes are mainly divided into two types below (as described in "Rice Cooking Techniques and Their Applications", edited by Hiroaki Horigome, Kogyo Gijutsukai K.K., pp. 314–347 (1990)).

(1) Gas Type Continuous Rice Cooking Machine: A chain conveyor for moving rice cookers is installed to run over a fire grate, and rice is cooked by passing the rice cookers over the fire grate successively. In this method, heating conditions in three stages, i.e., boiling, steaming and baking, which have been utilized traditionally in rice cooking, are reproduced.

(2) Steam Type Conveyor Rice Cooking Machine: Rice is put on a conveyor and moved through a steam tunnel for cooking. Rice is conveyed so as to successively slide through three steps, i.e., primary steaming, hot-water immersion (water absorption) and secondary steaming, whereby the rice is cooked continuously with movement of the conveyor.

The conveyor rice cooking machine of the above (2) is advantageous in that a rice cooking capability is more flexible and the machine is more easily adapted for larger-scale production, because the amount of rice can be optionally determined depending on the width of the conveyor and the height of rice put on the conveyor.

In addition, other various proposals have also been made for the purposes of, for example, improving quality of cooked rice to become more close to the ideal obtained by using rice cookers, achieving adaptability to various kinds of raw rice and a variety of finally cooked rice, and saving a space required for installation. Typical examples of those proposals are below.

(2-1) "Apparatus for Steaming Grains" (Japanese Unexamined Patent Publication No. Sho 63-9406), "Grain Steaming Apparatus" (Japanese Unexamined Patent Publication No. Sho 63-245646), "Grain Processing Apparatus" (Japanese Unexamined Patent Publication No. Hei 4-129510), and "Grain Continuous Processing Apparatus" (Japanese Unexamined Patent Publication No. Hei 5-308915).

These apparatus each comprises a combination of a primary steaming unit for heating rice by steam, an immersing unit in which the rice heated by steam is passed through hot water to absorb water, and a secondary steaming unit for promoting change into α-starch of the rice having absorbed water, these units being arranged in the order named. This type of continuous steaming apparatus has a feature that an installation space can be saved while ensuring a relatively high production capability. A series of the above-cited Patent Publications disclose various improvements in the component units and combinations thereof. The disclosed apparatus are however complicated in structure as a whole because they need a combination of three units having different specific roles, i.e., the primary steaming unit, the immersing unit and the secondary steaming unit.

(2-2) "Method for Steaming Hard Grains" (Japanese Unexamined Patent Publication No. Sho 59-11150).

This Patent Publication discloses a method for steaming hard grains, which comprises the steps of placing grains on a net conveyor in the form of a uniform layer, heating the grain layer by steam to effect primary steaming, sprinkling water to the grain layer while the grain layer is agitated, causing the grains to absorb water, and heating the grain layer again by steam as with the primary steaming, thereby effecting main secondary steaming. The disclosed method is featured in that an immersing unit such as described in the above (2-1) is not used, grains are continuously processed while being held on a single conveyor, and the amount of water sprinkled is adjusted depending on the property of grains, allowing the grains to absorb water properly. Hitherto, it has been generally considered difficult to absorb water into rice uniformly by the method of sprinkling water. According to the description of this Patent Publication, uniform water absorption by rice can be achieved by sprinkling water under agitation of the rice layer and controlling the amount of water sprinkled. However, the disclosed method is disadvantageous in that an agitating device must be disposed above the belt conveyor and grains of rice in a brittle condition before change into α-starch are easy to collapse, because the rice is agitated before the step of absorbing water into the rice having been subjected to the primary steaming or immediately after the start of the water absorbing step.

(2-3) "Method and Apparatus for Steaming Grains" (Japanese Unexamined Patent Publication No. Hei 9-107896) and "Method and Apparatus for Steaming Rice" (Japanese Unexamined Patent Publication No. Hei 9-294678).

These Patent Publications disclose a continuous rice steaming line for cooking rice carried on a belt conveyor through a primary steaming step of heating the rice by steam, a water applying step of sprinkling water to the rice, and a secondary steaming step of heating the rice by steam. The primary steaming step and the secondary steaming step employ belt conveyors running at different levels independently of each other.

The disclosed apparatus are featured in that water is absorbed into rice by sprinkling the water without using an immersing unit such as described in the above (2-1). In spite of not using any immersing unit, the disclosed apparatus are still complicated in structure because of the need of two belt conveyors which are disposed at different levels for the primary steaming and the secondary steaming.

SUMMARY OF THE INVENTION

The inventors of this application have accomplished a rice steaming apparatus comprising a single endless conveyor belt, a device for evenly supplying steam to a carrying surface of the endless conveyor belt from below the carrying surface, a device for evenly sprinkling hot water to the carrying surface in a position upstream of the center of the endless conveyor belt in the direction of running of the belt, and a housing made up of housing members to surround those components respectively from above and below in a moderate air-tight manner, wherein rice is placed on the carrying surface in the form of a layer and is moved with the endless conveyor belt for cooking without agitating the rice layer. The present invention intends to achieve an improved application of such a rice steaming apparatus. Thus, an object of the present invention is to provide a rice continuously processing apparatus which is more effectively adapted for cooking various kinds of raw rice and producing a variety of cooked rice on the basis of the above rice steaming apparatus.

More specifically, the present invention is featured by a combination of a steaming line constructed of a single endless conveyor, and a setting (the term "settling" means allowing steamed rice to settle by its own extra heat) and/or cooling line constructed of a plurality of combined endless conveyor belts arranged downstream of the steaming line.

The steaming line constructed of a single endless conveyor in the present invention is first explained.

A method for continuously steaming rice by using the steaming line comprises the steps of placing rice, that has finished preliminary water absorption, on a carrying surface of a single conveyor belt evenly, moving the carrying surface while blowing steam to the rice placed on the carrying surface, and effecting primary steaming of the rice, sprinkling of hot water to absorb water into the rice, and secondary steaming of the rice having absorbed water successively during movement of the carrying surface without agitating the rice, the above steps being performed within a sealed housing. In the water absorbing step, preferably, hot water is sprinkled to absorb water into the rice at the same time as when steam is blown to the rice.

An apparatus for continuously steaming rice used to implement the steaming line is constructed as follows. A housing made up of a lower housing member and an upper housing member capable of moving vertically relative to the lower housing member is sealed at the boundary between the upper and lower housing members by water drained to the boundary during a steaming step. An air-permeable endless conveyor belt and a steam supply device for blowing steam to rice on a carrying surface of the conveyor belt are provided in a space defined by the housing. A sprinkler for sprinkling hot water to the rice is provided upstream of the center of the conveyor belt. A supply port and a discharge port for respectively supplying and discharging raw rice and steamed rice to and from the conveyor belt are also provided. An adjusting plate for adjusting a height of the rice placed on the conveyor belt is provided at the supply port, and a shut-off plate is provided at the discharge port to be capable of tilting in the direction of movement of the carrying surface to moderately seal the discharge port. Steam in the housing is exhausted through exhaust ports formed in a top panel of the upper housing member and then ducts. The ducts each have a double-wall structure comprising an inner tube and an outer tube sliding relative to each other so that the duct can move vertically in a telescoping manner.

In the above construction, rice is supplied through the supply port onto the carrying surface of the endless conveyor belt while the height of the rice placed on the carrying surface is adjusted by the rice height adjusting plate. The rice placed on the carrying surface is moved rearward with the endless conveyor belt, and during the movement, steam is blown from the steam supply device to the rice to heat it for primary steaming. At the same time as when steam is blown from the steam supply device to the rice, hot water is sprinkled to the rice, causing the rice to absorb water. Then, steam is blown from the steam supply device to the rice again to heat it for secondary steaming, thereby completely steaming the rice. The steamed rice is discharged through the discharge port to the outside of the steaming apparatus.

By sprinkling hot water to the rice at the same time as when the rice is heated by steam, the rice can absorb water in a sufficient amount even with the hot water being at a relatively low temperature (60° C. to 85° C.). Because hot water is supplied from above and steam is blown from below for heating the rice, there occurs a slope in distribution of water temperature across a rice layer on the carrying surface in the vertical direction. This results in a difference of the timing at which the rice absorbs water in upper and lower portions of the rice layer. However, the rice can evenly absorb water eventually, and hence agitation of the rice layer is not required.

Between the primary steaming step and the water absorbing step and/or between the water absorbing step and the secondary steaming step, a shut-off plate capable of tilting so as to moderately seal a passage opening for the rice layer may be provided for moderate partition between the above steps.

Further, since the upper and lower housing members are mated with each other just through water sealing, the upper housing member can be easily moved upward to make the steaming apparatus open on the upper side for cleaning or maintenance service of the interior of the apparatus. As a result, it is possible to perform, as needed, cleaning or maintenance service of the interior of the apparatus.

The settling and/or cooling line constructed of a plurality of combined endless conveyor belts arranged downstream of the steaming line is next explained.

The settling and/or cooling line includes a first endless conveyor belt provided in a housing and moving with steamed rice placed on an air-permeable carrying surface thereof, a rotary comb for shuffling the steamed rice on the first endless conveyor belt, a second endless conveyor belt having an air-permeable carrying surface positioned at a level lower than the first endless conveyor belt by a step to receive the steamed rice from the first endless conveyor belt and moving with the steamed rice thereon, and another rotary comb for shuffling the steamed rice on the second endless conveyor belt. Further, an air supply duct is provided on the upper side of the housing for introducing cold air to the housing, and cooling air receivers and exhaust ducts are provided to cover the underside of the first and second endless conveyor belts from below for receiving and exhausting the cooling air. A guide plate (14) for guiding the steamed rice from the first endless conveyor belt to the second endless conveyor belt and a nozzle for spraying seasoning liquids to the steamed rice are provided in a stepped area between the first endless conveyor belt and said second endless conveyor belt.

With the above construction, when rice steamed by the continuous steaming apparatus is sent to the first endless conveyor belt, the steamed rice transfers onto the first endless conveyor belt and moves into the housing therewith. The rice steamed in a state completely changed into α-starch (gelatinized starch) is shuffled and cooled gently while moving with the first endless conveyor belt, so that the steamed rice settles by its own extra heat. Then, the steamed rice slides down along the guide plate for transfer from the first endless conveyor belt to the second endless conveyor belt in such a manner that the mass of the steamed rice is broken down and shuffled. Seasoning liquids are sprayed to the steamed rice falling along the guide plate to season the steamed rice.

After falling down along the guide plate, the steamed rice is placed on the second endless conveyor belt and moved in the housing therewith. While moving with the second endless conveyor belt, the steamed rice is shuffled by the rotating comb and quickly cooled by cold air blown from the air supply duct. The steamed rice having cooled down exits the housing and, when frozen, it is sent to a refrigerating apparatus in the next stage.

The rice, that is steamed by the continuous steaming apparatus in a state partly changed into α-starch for the purpose of quick cooking, is shuffled by the rotating combs and quickly cooled by cold air blown from the air supply ducts while moving in the housing with the first and second endless conveyor belt.

The cold air blown from the air supply ducts is forced to pass through the steamed rice on the endless conveyor belts and is exhausted through the cooling air receivers and the exhaust ducts which are provided below the endless conveyor belts.

Raw material rice processed in accordance with the present invention implies all kinds of rice including Japonica, Indica and Japanica in terms of botanical classifications, and any shapes of individual grains including long, medium and short grains.

Further, steamed rice processed in accordance with the present invention is not limited to rice steamed in a state completely changed into α-starch, but include rice steamed in a state partly changed into α-starch for quick cooking. In addition, the term "steamed rice" used herein implies white rice, Sushi rice, seasoned rice, red rice, glutinous rice, steamed rice as materials for brewing sake (so-called sake rice), rice cakes and so on.

(1) Production of Steamed Rice

In the steaming line, rice is processed on one endless conveyor in three stages successively, i.e., a primary steaming step for heating the rice by steam, a water absorbing step of sprinkling hot water to the heated rice and absorbing water into the rice, and a secondary steaming step for heating the rice, that has absorbed water, by steam for conversion into a state completely changed into α-starch. In the settling and/or cooling line, the steamed rice is first shuffled by using a rotary stirring device and/or causing the rice to fall down across a level difference between the lines, while the steam rice is allowed to settle by its own extra heat. As a result of the "settling" step, water distribution from the surfaces of the individual grains of rice to the interior thereof is stabilized, resulting in a state of "so-called boiled and steamed rice". Subsequently, in the case of white rice (rice cooked using only polished rice), the settled rice is quickly cooled down below the room temperature by blowing cold air to it. The steamed rice having cooled down is then taken out as a final product as it is or after having been frozen.

For sushi rice (rice steamed and seasoned with vinegar) and rice seasoned with other seasoning liquids, after being processed in a like manner as with white rice, vinegar or suitable seasoning liquids are sprayed to the steamed rice midway the settling and/or cooling line. Thus, the so-called red rice (rice steamed with redbeans, steamed glutinous rice, steamed rice as materials for brewing sake, and rice cakes, are cooked by processing rice under case-by-case conditions appropriately adjusted on the basis of those for producing white rice.

(2) Production of Steamed Rice in State Partly Changed into α-Starch for Quick Cooking In the steaming line, rice is processed on one endless conveyor just by being supplied with steam for heating. The rice is steamed in a state not completely changed into α-starch.

In the settling and/or cooling line, the steamed rice is first shuffled by using a rotary stirring device and/or causing the rice to fall down across a level difference between the lines under natural cooling. Subsequently, the steam rice is cooled with air at the room temperature and then quickly cooled down below the room temperature with cold air having passed through a refrigerator. The steamed rice having cooled down is taken out as a final product as it is or after having been frozen. For the rice processed by quick cooking to cook rice with assorted mixtures, suitable seasoning liquids are sprayed to the steamed rice midway the settling and/or cooling line.

DETAILED DESCRIPTION OF PREFERRED EMBODIMENT

The present invention will be described below in more detail in conjunction with a preferred embodiment.

An apparatus for continuously steaming rice used in the present invention is first explained below.

Figure 1:
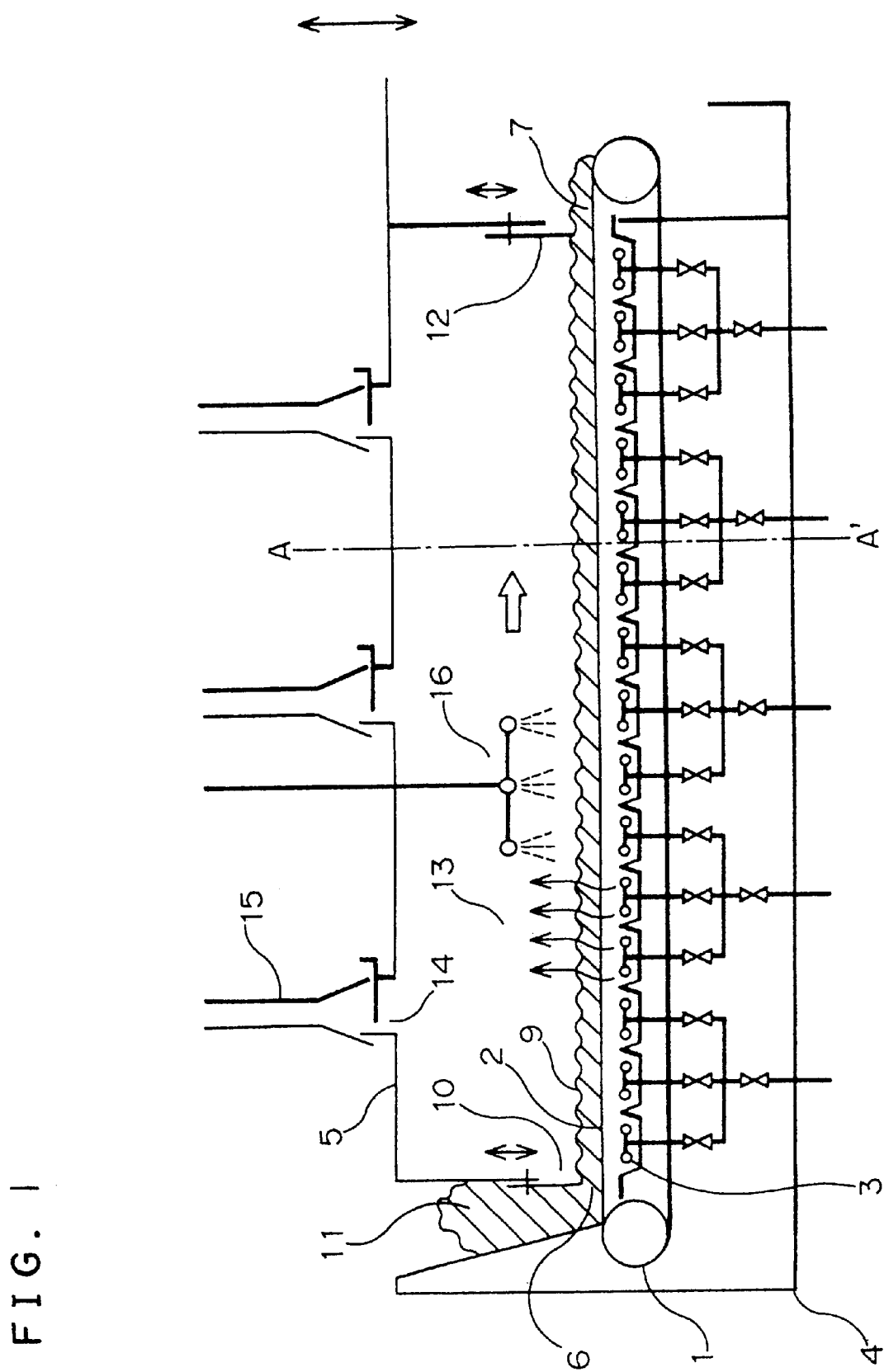
FIG. 1 is a sectional view for explaining an apparatus for continuously steaming rice used in the present invention.

As shown in FIG. 1, the continuous steaming apparatus includes a housing made up of an upper housing member 5 and a lower housing member 4. The upper housing member 5 is in the form of a box-like lid capable of moving vertically in covering relation to the lower housing member 4.

A single endless conveyor belt 1 is provided in a space defined by the housing members 4, 5 to carry rice placed on the belt 1 therewith.

The endless conveyor belt 1 is driven by rotary drums disposed in longitudinally spaced ends in the direction of running of the belt. A larger-scale apparatus requiring a larger driving force can also be constructed by using a combination of an endless conveyor belt provided with chains attached to both side edges extending in the direction of running of the belt, and rotary drums provided with sprocket gears for driving the chains.

Banks or walls for supporting a rice layer from both sides are provided to face opposite transverse ends of the endless conveyor belt 1 with respect to the direction of running of the belt. Each of the banks has a larger height than the rice layer, and is arranged a little offset inward from the corresponding side edge of the endless conveyor belt Preferably, a portion of the bank coming into slide contact with the conveyor belt is made of ethylenetetrafluoride (trade name: Teflon).

The endless conveyor belt 1 comprises a metal- or resin-made conveyor belt having a large number of pores which are formed in a uniform pattern and has a size enough to allow steam to penetrate the belt evenly, but to block grains of rice from passing through the belt. The conveyor belt 1 is usually formed of a stainless steel net. A carrying surface 2 of the conveyor belt 1 may be coated with a release promoting film made of ethylenetetrafluoride (trade name: Teflon).

The moving speed of the carrying surface 2 is optionally selected depending on the amount and kind of rice to be processed or the kind of finally cooked rice.

Below the rear side of the carrying surface 2 of the endless conveyor belt 1, there is assembled a framework constructed perpendicularly and obliquely with respect to the direction of running of the belt. The carrying surface 2 is supported on the framework so as to slide over it. Because of the framework constructed obliquely, it is possible to avoid such an adverse situation that steam is not supplied to particular positions on the carrying surface 2. Further, by employing such a framework structure for supporting the carrying surface 2, a larger-scale apparatus of which carrying surface is subjected to a greater load can be constructed.

Also, as shown in FIG. 1, a sprinkler 16 is installed above midway the carrying surface 2. The sprinkler 16 can be installed in any position near the center of the carrying surface 2 in the direction of running of the belt. However, the sprinkler 16 is preferably installed in a position upstream of the center of the carrying surface 2 from a point of enabling the sprinkler 16 to be operated in more flexible ways depending on, e.g., the kind of rice to be processed.

The sprinkler 16 comprises a plurality of tubes extending transversely with respect to the direction of running of the belt over a distance almost equal to the belt width, and a plurality of hot-water ejection holes are formed in each of the tubes with predetermined intervals in the transverse direction so that hot water can be evenly sprinkled toward the carrying surface.

The number of tubes of the sprinkler 16 can be set optionally, but it is usually desired to provide 2–6 tubes from a point of enabling hot water to be sprinkled in more flexible manners depending on, e.g., the kind of rice to be processed. The temperature of hot water can also be set optionally, but hot water at 60–95° C. is preferably used because such a temperature range can provide good absorption of water into rice that has been heated by steam and changed into α-starch in the surface thereof. Also, the amount of hot water sprinkled is adjusted appropriately depending on the amount and kind of rice to be processed or the kind of finally cooked rice.

Further, as shown in FIG. 1, in a condition where the lower housing member 4 and the upper housing member 5 are mated with each other, a gap defined between the carrying surface and a layer height adjusting plate 10 provided on the upper housing member 5 serves as a supply port 6 through which rice is supplied onto the carrying surface. Likewise, a gap defined between the carrying surface and a shut-off plate 12 provided on the upper housing member 5 serves as a discharge port 7 through which the cooked rice is discharged from the carrying surface.

Rice that has finished preliminary water absorption is continuously placed into a hopper portion 11 located in front of the supply port 6. The thickness of a layer 9 of the rice supplied onto the carrying surface is adjusted by the height of the layer height adjusting plate 10. The thickness of the rice layer 9 is selected appropriately depending on the amount and kind of rice to be processed or the kind of finally cooked rice.

Because the rice to be processed is put in the hopper portion 11, the supply port 6 is moderately sealed by a stack of the rice in the hopper portion 11 to prevent steam from escaping through the supply port 6. Note that the amount of rice placed into the hopper portion 11 can be controlled by, for example, monitoring a level of the rice in the hopper portion 11 with any desired level sensor and then adjusting the amount of rice supplied.

The height of the shut-off plate 12 defining the discharge port 7 is adjusted so that the discharge port 7 is moderately sealed to prevent steam from escaping through the discharge port 7. Additionally, the shut-off plate 12 is structured to be capable of tilting in the direction of running of the belt to ensure that the discharge port 7 is moderately sealed without causing any damage, e.g., crush, on the layer 9 of the rice steamed and moved through the discharge port 7 successively.

As shown in FIG. 1, exhaust ports 14 are formed in a top panel of the upper housing member 5 at appropriate positions. A duct 15 is provided above the exhaust port 14, and steam rising toward the exhaust port 14 is sucked through the duct 15 by a fan. The exhaust amount is adjustable by opening and closing a regulating plate associated with the exhaust port 14. A specific value of the exhaust amount is set appropriately depending on the amount and kind of rice to be processed or the kind of finally cooked rice.

Incidentally, the duct 15 has a telescoping structure, i.e., a double-wall structure comprising an inner tube and an outer tube sliding relative to each other, allowing the duct 15 to move vertically together with the upper housing member 5.

Figure 2:
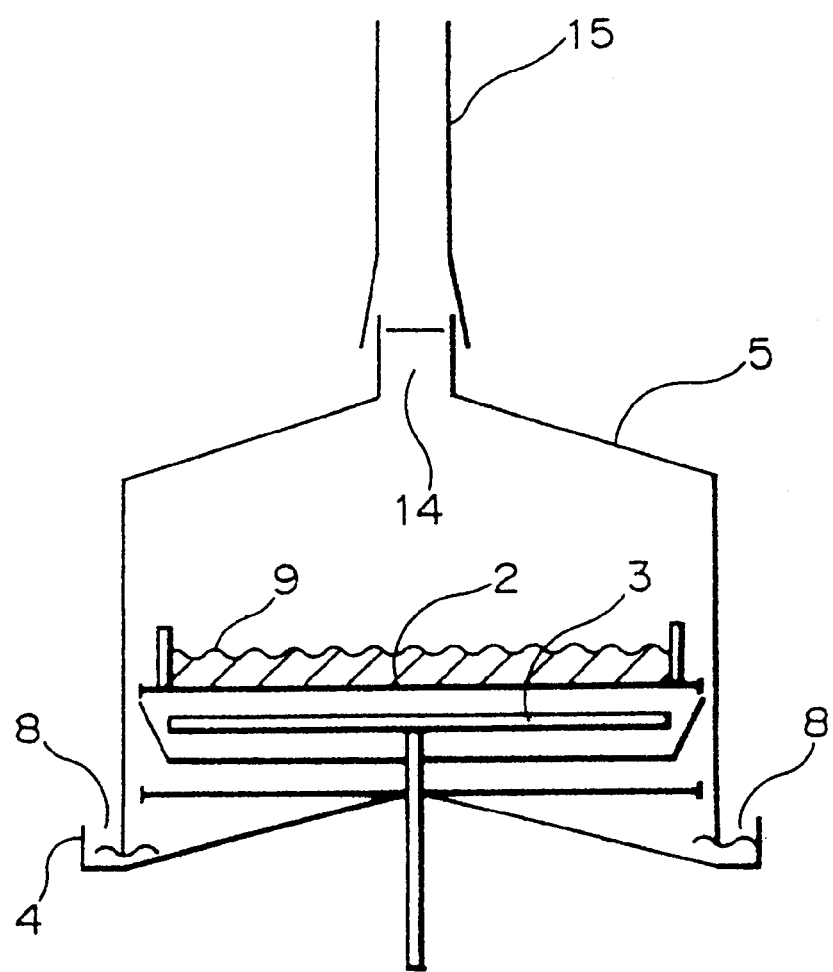
FIG. 2 is a sectional view taken along line A–A' in FIG. 1.

As shown in FIG. 2, the lower housing member 4 is arranged to surround from below a steam supply device 3 disposed on the rear side of the carrying surface 2 of the 4 endless conveyor belt 1, and the upper housing member 5 being of box-like lid is arranged in covering relation to the lower housing member 4 in a vertically movable manner. Though not particularly limited in materials, the lower housing member 4 and the upper housing member 5 are each preferably made of such a material as having both properties of heat resistance and heat insulation, and enabling cleaning and maintenance service to be easily performed. The housing members 4, 5 can be usually made of stainless steel.

The upper housing member 5 is of a structure capable of moving vertically through a large stroke. By moving the upper housing member 5 upward, the steaming apparatus is opened on the upper side, making it easy to perform cleaning and maintenance service for the interior of the apparatus.

As mentioned above with reference to FIG. 2, the lower housing member 4 is arranged to surround from below the steam supply device 3 disposed on the rear side of the carrying surface 2 of the endless conveyor belt 1. A bottom surface of the lower housing member 4 is sloped downward from the center toward opposite side ends transversely with respect to the direction of running of the belt, the side ends being formed into gutters 8.

Water produced upon condensation of steam and then falling downward and extra hot water sprinkled to rice but not absorbed by the rice run down along the sloped bottom surface of the lower housing member 4 and are accumulated in the gutters 8 at both side ends. The water in the gutters 8 is discharged while being adjusted such that some water always resides in the gutters. Since opposite side ends of the upper housing member 5 are engaged in the gutters 8, the adjoining boundary between the upper housing member 5 and the gutters 8 is sealed by the water residing in the gutters, thereby keeping air-tightness of a space defined by the housing members 4, 5.

Figure 3:
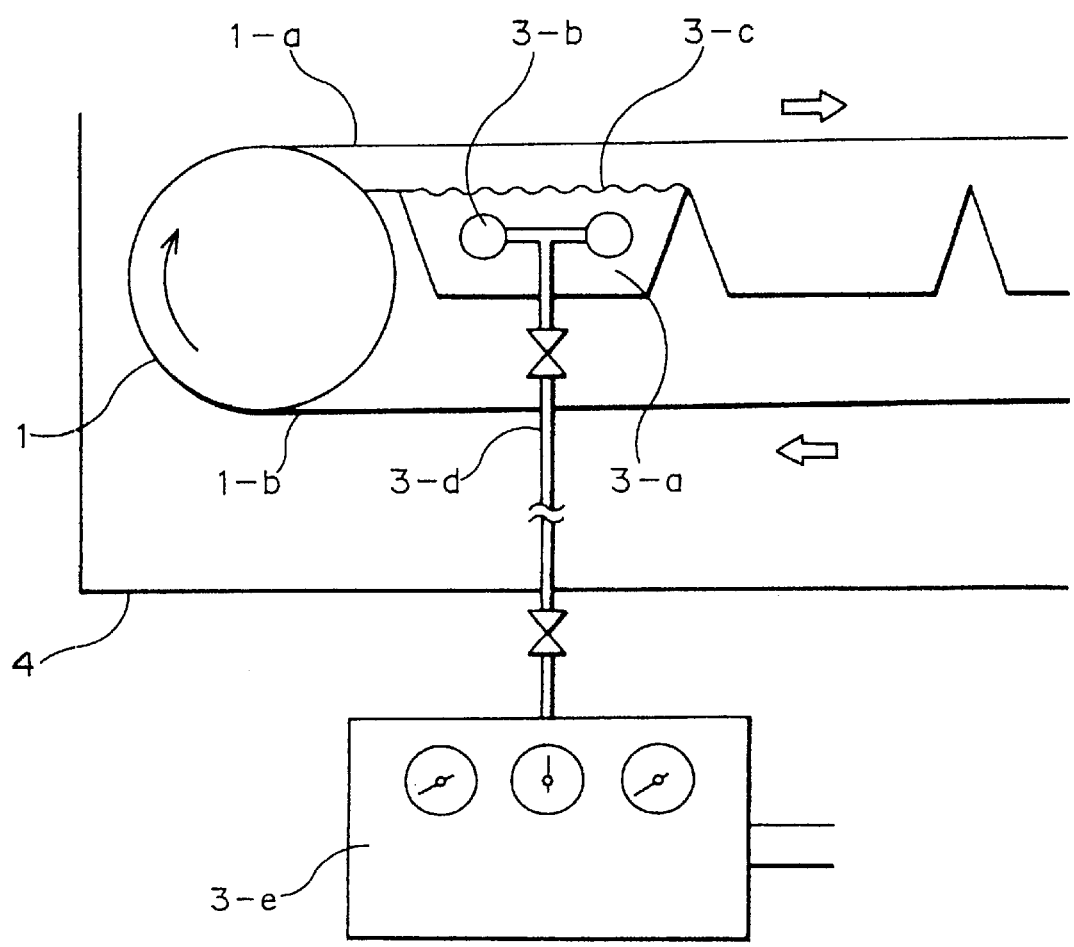
FIG. 3 is a sectional view for explaining a steam supply device for supplying steam into a housing made up of upper and lower housing members.

As shown in FIG. 3, the steam supply device 3 disposed in a space defined between an upper running portion 1-a and a lower running portion 1-b of the endless conveyor belt 1 comprises a steam chamber 3-a, steam supply tubes 3-b, a steam guiding porous plate 3-c, a steam introducing tube 3-d, and a steam regulator 3-e, the first three 3-a to 3-c being installed adjacent to the upper running portion 1-a, the last 3-e being installed outside the lower housing member 4.

The amount and temperature of steam supplied is selected appropriately depending on the amount and kind of rice to be processed or the kind of finally cooked rice.

The steam chamber 3-*a* is in the form of a box opened upward and having a width almost equal to the transverse width of the endless conveyor belt 1 with respect to the direction of running of the belt. Also, the steam chamber 3-*a* is installed in plural number in closely adjacent parallel relation in the direction of running of the endless conveyor belt 1.

Both side surfaces of the steam chamber 3-*a* transversely of the direction of running of the belt are capable of opening and closing for maintenance service. Water produced upon liquefaction of steam is discharged through a slight gap in the opening and closing portion of the steam chamber 3-*a*, and then falls down to the bottom surface of the lower housing member 4.

The steam supply tubes 3-*b* are each provided in an inner space of the steam chamber 3-*a* to extend over a distance almost equal to the width of the steam chamber. A plurality of steam ejection holes are formed in each of the steam supply tubes 3-*b* with predetermined intervals in the transverse direction such that steam at a high temperature is ejected through the holes downward.

The steam guiding porous plate 3-*c* comprises a porous plate or a mesh with a large number of pores distributed evenly, and is installed to cover an open upper surface of the steam chamber 3-*a*. The steam guiding porous plate 3-*c* has functions of causing steam to be evenly dispersed and supplied to the carrying surface 2, and trapping steam that is apt to easily condense when the steam passes through the porous plate 3-*c*, the trapped steam being condensed into water droplets and then removed. The latter function contributes to preventing water from being supplied in an excessive amount to the rice on the carrying surface.

The steam introducing tube 3-*d* is a hollow tube for introducing steam supplied from the steam regulator 3-*e*, which is installed outside the lower housing member 4, to the steam supply tubes 3-*b*. A lagging material is wound over a portion of the steam introducing tube 3-*d* which is located outside the lower housing member 4, thereby keeping that portion positively insulated against heat. Midway the steam introducing tube 3-*d*, a valve for adjusting the amount of steam supplied is provided at an appropriate position.

The steam regulator 3-*e* is a device for regulating steam into a condition suitable for steaming rice. The steam regulator 3-*e* prepares water vapor having higher preserved energy and consisting of finer mist by removing wet steam, that is apt to easily condense into water droplets, from steam supplied from an ordinary boiler. The temperature of the water vapor thus prepared is in the range of 100–115° C.

The settling and/or cooling line is next explained below.

In use, this line is coupled directly or indirectly to the continuous steaming apparatus described above.

The endless conveyor belt 1 comprises a metal- or resin-made conveyor belt having a large number of pores which are formed in a uniform pattern and has a size enough to allow air to penetrate the belt evenly, but to block grains of rice from passing through the belt. The conveyor belt 1 is usually formed of a stainless steel net. A carrying surface 2 of the conveyor belt 1 may be coated with a release promoting film made of ethylenetetrafluoride (trade name: Teflon).

The moving speed of the carrying surface 2 is optionally selected depending on the amount and kind of rice to be processed or the kind of finally cooked rice.

The endless conveyor belt 1 is driven by rotary drums 3-*a*, 3-*b* disposed at ends longitudinally spaced along the carrying surface 2. A larger-scale apparatus requiring a larger driving force can also be constructed by using a combination of an endless conveyor belt provided with chains attached to both side edges extending in the direction of running of the belt, and rotary drums provided with sprocket gears for driving the chains.

The endless conveyor belt 1 is installed to run at an ascending slope in the longitudinal direction of the carrying surface 2. The endless conveyor belt 1 is coupled to a subsequent endless conveyor belt 4 which is installed to run from a position lower than the top end of the belt 1 by a step in overlapped relation. The endless conveyor belt 4 also comprises a metal- or resin-made conveyor belt having a large number of pores which are formed in a uniform pattern and has a size enough to allow air to penetrate the belt evenly, but to block grains of rice from passing through the belt; namely, the belt 4 has similar construction and properties as those of the endless conveyor belt 1, including a carrying surface 5.

Also, the endless conveyor belt 4 is driven by rotary drums 6-*a*, 6-*b* disposed at ends longitudinally spaced along the carrying surface 5. The rotary drums 6-*a*, 6-*b* are rotated by chains similarly to the rotary drums 3-*a*, 3-*b*.

Cooling air receivers 7, 8 and exhaust ducts 9, 10, which are connected to the cooling air receivers 7, 8, are installed on the rear side of the carrying surfaces 2, 5 of the endless conveyor belts 1, 4 in close positions. Air passes through the carrying surfaces 2, 5 from the upper side to the lower side, followed by being exhausted through the exhaust ducts 9, 10 from the cooling air receivers 7, 8.

The endless conveyor belts 1, 4 installed in coupled arrangement, as mentioned above, are covered by a housing 11 comprised of upper and lower housing members. However, the endless conveyor belts 1, 4 are partly projected out of the housing 1 from an inlet 12 and an outlet 13 spaced in the direction of running of the endless conveyor belts 1, 4. The inlet 12 is located in a position close to and lower than the discharge port of the continuous steaming apparatus (not shown) by a step for coupling that apparatus and the settling/cooling line to each other. The coupling portion is loosely covered by a housing (not shown) from above so that steamed rice coming out of the discharge port of the continuous steaming apparatus (not shown) is introduced to the housing 11 of the settling/cooling line without being exposed to open air.

An inclined guide 14 is provided in a stepped coupling portion between the preceding endless conveyor belt 1 and the succeeding endless conveyor belt 4. The steamed rice coming out of the carrying surface 2 slides down over the guide 14, and is turned upside down for shuffling of the rice at the time of transferring onto the carrying surface 5.

Rotary combs 15 having a plurality of teeth are provided above the carrying surfaces 2, 5 of the endless conveyor belts 1, 4 in positions near the upper ends and the centers thereof, assisting to stir the steamed rice. Whether to provide the rotary combs or not is optional.

Further, in the stepped coupling portion between the preceding endless conveyor belt 1 and the succeeding endless conveyor belt 4, there is provided a set of nozzles 16 which is positioned face an upper portion of the inclined guide 14 and is extended transversely with respect to the direction of movement of the carrying surface 2 over a distance almost equal to the width of the carrying surface 2 for uniformly spraying oil and vinegar or seasoning liquids toward the falling steamed rice.

Another set of nozzles similar to the above set of nozzles 16 may be provided at the inlet 12 which is located in a position close to and lower than the discharge port of the continuous steaming apparatus (not shown) for line interconnection. Spraying vinegar or seasoning liquids in multiple stages contributes to more uniform seasoning of the steamed rice.

Air supply ports 17 and air supply ducts 18 are provided in and on a top panel of the housing 11 for blowing cooling air into the housing 11. A refrigerator (not shown) is appropriately incorporated in the air supply ducts 18 for controlling the temperature of supplied air.

Figure 4:
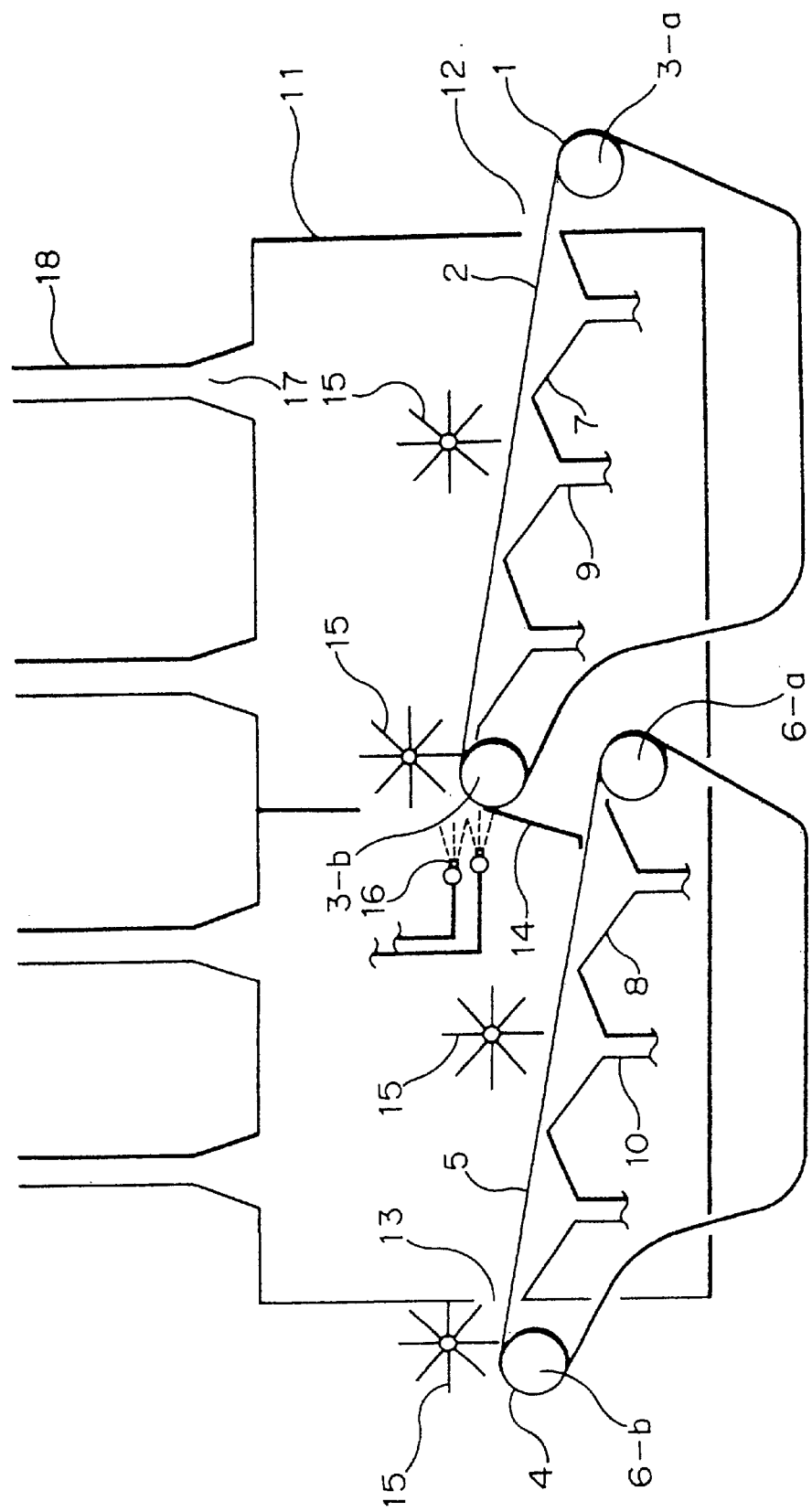
FIG. 4 is a schematic view for explaining a settling and/or cooling line.

While FIG. 4 illustrates the settling and/or cooling line comprising a combination of two endless conveyor belts, the line may comprise one or three or more endless conveyor belts.

A variety of cooked rice can be produced through the following steps.

Sorting step: this step removes impurities, such as small stones and dust, from raw material rice.

Washing step: this step washes out bran, etc. from rice surfaces.

Immersing step: this step absorbs water into the washed rice.

Steaming step: this step processes the rice by the steaming apparatus of the present invention.

Cooling step: this step processes the steamed rice by the settling and/or cooling apparatus of the present invention.

Freezing step: this step freezes the cooled rice.

By combining the steaming step and the subsequent cooling step under properly adjusted conditions, it is possible to cook rice through a single line not only in a state completely changed into α-starch, but also in a state partly changed into α-starch for the purpose of quick cooking, etc. One example of a method for cooking rice in a state partly changed into α-starch is disclosed in Japanese Unexamined Patent Publication No. Hei 8-70800 proposed by one of the inventors of this application. Further, the kind of finally cooked rice is not limited to the so-called white rice (rice cooked using only polished rice), and cooked rice seasoned with vinegar for sushi or including assorted mixtures can also be produced. In the latter case, the cooked rice is seasoned by spraying liquefied oil or seasonings in the cooling step subsequent to the steaming step according to the present invention.

Specific examples of the process for steaming rice according to the present invention will be described below.

Conditions of the steaming process and the settling and/or cooling process depending on the kinds of finally cooked rice are explained in connection with the case of the settling and/or cooling apparatus using a combination of the two endless conveyor belts as shown in FIG. 4.

(1) Production of White Rice

Raw rice having been subjected to primary water absorption in the immersing step is placed into the hopper portion 11, and the rice layer 9 having a proper height adjusted by the layer height adjusting plate 10 is moved within the steaming apparatus while resting on the carrying surface 2 of the endless conveyor belt 1. Steam is evenly supplied from the steam supply device 3 to the carrying surface 2 from below. Water absorbed in the rice during the primary water absorption is heated by the steam, changing the rice surface into α-starch.

At the time the rice surface is changed into α-starch to an appropriate extent, hot water is evenly sprinkled to the rice from the sprinkler 16 installed above the carrying surface 2. The hot water running over the surfaces of individual grains is heated by the steam and absorbed by the rice.

The rice having absorbed water in an appropriate amount is further heated by the steam, thereby producing the steamed rice in a state completely changed into α-starch.

When the steamed rice transfers to the settling and/or cooling line, it is shuffled by virtue of, though not shown, a rotary comb and falling across the level difference between the lines. At this transfer, liquefied oil may be sprayed to the steamed rice. In the first half of the housing of the settling and/or cooling line, the steamed rice is allowed to settle by its own extra heat without supplying and exhausting air, so that water distribution from the surfaces of the individual grains of rice to the interior thereof is stabilized.

In the second half of the housing of the settling and/or cooling line, the steamed rice is quickly cooled by blowing cold air cooled down below the room temperature. The steamed rice having cooled down is then taken out as a final product as it is or after having been frozen.

Incidentally, when producing the so-called red rice (rice steamed with red beans, steamed glutinous rice, steamed rice as materials for brewing sake, and rice cakes, respective suitable raw rice can be appropriately processed under case-by-case conditions adjusted on the basis of those for producing white rice.

(2) Sushi Rice and Seasoned Rice

Rice steamed and seasoned with vinegar, etc. for sushi and other purposes can be cooked in a like manner to the case of cooking white rice through the entire process except the following point.

At the transfer from the steaming line to the settling and/or cooling line, vinegar or seasoning liquids are applied to the steamed rice. By spraying vinegar or seasoning liquids to the steamed rice again while the steamed rice transfers from the first half to the second half in the housing of the settling and/or cooling line, it is possible to obtain a finished product, i.e., finally cooked rice, seasoned more uniformly.

(3) Production of Rice Steamed in State Partly Changed into α-Starch for Quick Cooking Rice is supplied to the steaming apparatus in a like manner as in the above-explained process of cooking rice in a state completely changed into α-starch. In this process, the sprinkler 16 is not operated, and the rice is processed just under heating by steam supplied from the steam supply device 3.

When the steamed rice transfers to the settling and/or cooling line, it is shuffled by virtue of the rotary comb and falling across the level difference between the lines. In the first half of the housing of the settling and/or cooling line, air at the room temperature is supplied to excessive heat of the steamed rice. In the subsequent second half of the housing, the steamed rice is quickly cooled down below the room temperature by blowing cold air having passed a refrigerator.

The steamed rice having cooled down is then taken out as a final product as it is or after having been frozen.

In the case of steaming rice with assorted mixtures for quick cooking, vinegar or seasoning liquids are applied to the steamed rice at the transfer from the steaming line to the settling and/or cooling line. By spraying vinegar or seasoning liquids to the steamed rice again while the steamed rice transfers from the first half to the second half in the settling and/or cooling line, it is possible to obtain a finished product, i.e., finally cooked rice, seasoned uniformly.

What is claimed is:

1. An apparatus comprising a combination of a continuous steaming apparatus and a cooling apparatus, said continuous steaming apparatus being constructed such that a housing (4, 5) made up of a lower housing member (4) and an upper housing member (5) capable of moving vertically relative to said lower housing member (4) is sealed at the boundary between said upper and lower housing members (5, 4) by water drained to said boundary during a steaming step; an air-permeable endless conveyor belt (1), a steam supply device (3) for blowing steam to rice on a carrying surface (2) of said conveyor belt (1), and a supply port (6) and a discharge port (7) for respectively supplying and discharging the rice to and from said conveyor belt (1) are provided in a space defined by said housing (4, 5); an adjusting plate (10) for adjusting a height of the rice placed on said conveyor belt (1) is provided at said supply port (6); a shut-off plate (12) is provided at said discharge port (7) to be capable of tilting in the direction of movement of said carrying surface (2) to moderately seal said discharge port (7); steam in said housing (4, 5) is exhausted through exhaust ports (14) formed in a top panel of said upper housing member (5) and ducts (15) capable of sliding vertically; and a sprinkler (16) for sprinkling hot water to the rice is provided upstream of the center of said carrying surface(2), said cooling apparatus comprising a first endless conveyor belt (1) provided in a housing and moving with the steamed rice placed on an air-permeable carrying surface thereof, a rotary comb (15) for shuffling the steamed rice on said first endless conveyor belt (1), a second endless conveyor belt (4) having an air-permeable carrying surface positioned at a level lower than said first endless conveyor belt (1) by a step to receive the steamed rice from said first endless conveyor belt (1) and moving with the steamed rice thereon, another rotary comb (15) for shuffling the steamed rice on said second endless conveyor belt (4), an air supply duct (18) provided on the upper side of the housing for introducing cold air to the housing, cooling air receivers (7, 8) and exhaust ducts (9, 10) provided to cover the underside of said first and second endless conveyor belts from below for receiving and exhausting the cooling air, and a guide plate (14) for guiding the steamed rice from said first endless conveyor belt (1) to said second endless conveyor belt (4) and a nozzle (16) for spraying seasoning liquids to the steamed rice are provided in a stepped area between said first endless conveyor belt (1) and said second endless conveyor belt (4).

* * * * *